(12) United States Patent
Norris et al.

(10) Patent No.: US 12,257,545 B1
(45) Date of Patent: Mar. 25, 2025

(54) CARBON DIOXIDE GAS CAPTURE SYSTEM

(71) Applicant: Carbon Reform Inc., Philadelphia, PA (US)

(72) Inventors: Joanne Norris, Philadelphia, PA (US); Rakesh Ravi, Philadelphia, PA (US); Nickolas Martin, Philadelphia, PA (US); Daseul Jang, Newark, DE (US); Adam Fletcher, Havertown, PA (US)

(73) Assignee: Carbon Reform Inc., Philadelphia, PA (US)

( * ) Notice: Subject to any disclaimer, the term of this patent is extended or adjusted under 35 U.S.C. 154(b) by 0 days.

(21) Appl. No.: 18/916,452

(22) Filed: Oct. 15, 2024

Related U.S. Application Data

(60) Provisional application No. 63/591,374, filed on Oct. 18, 2023.

(51) Int. Cl.
*B01D 53/06* (2006.01)
*B01D 53/62* (2006.01)
*B01D 53/82* (2006.01)

(52) U.S. Cl.
CPC ............ *B01D 53/06* (2013.01); *B01D 53/62* (2013.01); *B01D 53/82* (2013.01); *B01D 2257/504* (2013.01); *B01D 2257/708* (2013.01); *B01D 2257/91* (2013.01); *B01D 2258/06* (2013.01); *B01D 2259/4508* (2013.01)

(58) Field of Classification Search
CPC ........ B01D 53/06; B01D 53/62; B01D 53/82; B01D 2257/504; B01D 2257/708; B01D 2257/91; B01D 2258/06; B01D 2259/4508

USPC ......................................................... 423/230
See application file for complete search history.

(56) References Cited

U.S. PATENT DOCUMENTS

| | | |
|---|---|---|
| 8,808,424 B2 | 8/2014 | Dinnage |
| 2006/0037478 A1 | 2/2006 | Mori et al. |
| 2006/0051274 A1 | 3/2006 | Wright et al. |
| 2011/0005272 A1 | 1/2011 | Wijmans et al. |
| 2011/0041688 A1 | 2/2011 | Eisenberger |
| 2011/0189075 A1 | 8/2011 | Wright et al. |
| 2011/0269920 A1 | 11/2011 | Min et al. |
| 2012/0121488 A1 | 5/2012 | Comrie |
| 2013/0008800 A1 | 1/2013 | Lakkaraju et al. |
| 2014/0298996 A1 | 10/2014 | Meirav et al. |
| 2016/0361680 A1 | 12/2016 | Elliott et al. |
| 2017/0028347 A1 | 2/2017 | Wright et al. |

(Continued)

FOREIGN PATENT DOCUMENTS

| | | |
|---|---|---|
| JP | H05184864 A | 7/1993 |
| WO | 2021150722 | 7/2021 |

*Primary Examiner* — Anita Nassiri-Motlagh
(74) *Attorney, Agent, or Firm* — MLO, a professional corp.

(57) ABSTRACT

The techniques described herein relate to systems and methods for capturing $CO_2$, including an air process zone, a sorbent wheel, a humid zone, and a $CO_2$ storage material. An inlet air stream can pass through the air process zone, and the sorbent wheel can rotate such that a portion of the sorbent wheel is alternatively exposed to the inlet air stream and to humid air in the humid zone. Sorbent material in the sorbent wheel can capture $CO_2$ from the inlet air stream when in the air process zone and release the $CO_2$ when exposed to the humid air in the humid zone. The $CO_2$ storage material can store the $CO_2$ after the $CO_2$ is released by the sorbent material in response to being exposed to the humid air in the humid zone.

20 Claims, 8 Drawing Sheets

(56) References Cited

U.S. PATENT DOCUMENTS

| | | |
|---|---|---|
| 2017/0209832 A1 | 7/2017 | Eisenberger |
| 2018/0050322 A1 | 2/2018 | Kimura et al. |
| 2018/0214822 A1 | 8/2018 | Eisenberger |
| 2018/0272277 A1 | 9/2018 | Cardiff |
| 2019/0336909 A1 | 11/2019 | Keith et al. |
| 2021/0387133 A1 | 12/2021 | Lackner et al. |
| 2022/0072471 A1 | 3/2022 | de Neve et al. |
| 2023/0015857 A1 | 1/2023 | Miller et al. |
| 2023/0023050 A1 | 1/2023 | Eisenberger et al. |
| 2023/0264137 A1 | 8/2023 | De Neve et al. |

CARBON DIOXIDE GAS CAPTURE SYSTEM

RELATED APPLICATIONS

This application claims the benefit of U.S. Provisional Patent Application No. 63/591,374 filed on Oct. 18, 2023, and entitled "CARBON DIOXIDE GAS CAPTURE SYSTEM," which is hereby incorporated by reference for all purposes.

BACKGROUND

Carbon dioxide ($CO_2$) is a climate problem and a human health problem. A large quantity of $CO_2$ can be present inside of buildings, from a combination of ambient air and occupant breathing concentrations. High quantities of $CO_2$ inside of buildings are not only a contributor to climate change but can also impact occupant health and cognitive ability. For example, $CO_2$ concentrations in office buildings can range from 400 ppm to 2500 ppm, and levels above about 1000 ppm have been shown to negatively affect cognitive performance during short-term exposure.

SUMMARY

In some embodiments, the techniques described herein relate to a system for capturing $CO_2$, including: an air process zone configured to allow an inlet air stream to pass through the air process zone; a sorbent wheel including a sorbent material; a humid zone proximate to the sorbent wheel; and a $CO_2$ storage material proximate to the humid zone; wherein the sorbent wheel is configured to rotate such that a portion of the sorbent material is alternatively exposed to the inlet air stream in the air process zone and to the humid zone, wherein the sorbent material is configured to capture $CO_2$ from the inlet air stream when in the air process zone, and to release the $CO_2$ when the sorbent material is exposed to humid air in the humid zone, and wherein the $CO_2$ storage material is configured to store the $CO_2$ after the $CO_2$ is released by the sorbent material in response to being exposed to the humid air in the humid zone.

In some embodiments, the techniques described herein relate to a method including: rotating a first portion of sorbent material into an air process zone within a first angular range using a rotatable sorbent wheel, wherein an inlet air stream flows through the first portion of the sorbent material in the air process zone; capturing $CO_2$ from the inlet air stream using the first portion of the sorbent material in the air process zone; rotating the first portion of the sorbent material into a humid zone within a second angular range using the rotatable sorbent wheel, wherein the first portion of the sorbent material is exposed to a humid environment in the humid zone; releasing the $CO_2$ from the first portion of the sorbent material, while the first portion is in the humid zone; and storing the $CO_2$ using a storage material located proximate to the humid zone, wherein the storage material is configured to capture and store the $CO_2$ released from the first portion of the sorbent material.

DETAILED DESCRIPTION

This disclosure describes systems and methods for ambient carbon dioxide ($CO_2$) capture. A $CO_2$ sorbent material is used to capture (e.g., adsorb) $CO_2$ from an inlet air stream. The $CO_2$ sorbent material can be arranged in a sorbent wheel, which rotates the sorbent material. The sorbent wheel rotates the sorbent material such that it alternately passes through an air process zone where $CO_2$ is captured (or adsorbed) from the inlet air stream, and a humid zone wherein the $CO_2$ is released (e.g., desorbed) from the sorbent material in humid air.

In some embodiments, a system for capturing $CO_2$ includes a humidity-swing sorbent material arranged in a sorbent wheel, which is a rotating assembly containing the sorbent material (similar to a desiccant wheel). The sorbent wheel is configured to rotate the sorbent material into an air process zone where $CO_2$ is captured (or adsorbed) from an inlet air stream, and then into a humid zone wherein the $CO_2$ is released (e.g., desorbed) from the sorbent material in humid air. In some cases, the system is configured such that the sorbent material passes through a drying zone in between the humid zone and the capture zone. In some cases, the drying zone can be an air curtain. In some cases, the humid zone can contain a humidity control system (or a dehumidifier/humidifier), and optionally one or more fans to create an airflow (e.g., a closed airflow loop, or a circular airflow) in the humid zone. In some cases, the drying zone can include a dehumidifier and optionally a fan to circulate air and move water from the $CO_2$ sorbent material to the dehumidifier.

The systems and methods described herein advantageously capture $CO_2$ from ambient air, for example, from air within a building. In some cases, the systems described herein can beneficially be incorporated into existing heating, ventilation, and air conditioning (HVAC) systems. For example, the systems described herein can be coupled to a return side of an HVAC system. The HVAC system can supply the inlet airstream, for example, containing substantially dry air, to the systems described herein. Substantially dry air can be air that has a humidity content of less than about 70%, or less than about 50%, or less than about 20%, or less than about 10%, or from about 10% to about 70%, or from about 20% to about 70%, or from about 10% to about 50%, or from about 20% to about 50%. For example, the systems described herein could be located just upstream from an air handling unit of an HVAC system, and can be used to process air returning from or being supplied to a room or building. In some cases, the systems described herein can process all of the air handled by an HVAC system, and in other embodiments, the systems can process a portion of the air handled by an HVAC system. In some cases, the systems and methods described herein will include one or more fans to draw an inlet air stream into the system for processing. In some cases, such systems may be configured to process air from a room or building, or other space, and may not be directly integrated into an HVAC system. In some cases, the systems and methods described herein include one or more fans at an outlet of the system (e.g., an outlet where the processed air exits the air process zone), for example, to control the flow of the inlet air stream and/or the pressure upstream from the fan and/or the system.

In some cases, one or more dampers (i.e., adjustable doors or flaps in a duct or opening through which the inlet air stream flows) can be included in the systems described herein, for example, on an inlet or outlet of the system. In cases where the systems are coupled to an HVAC system, one or more dampers can be included in a duct of the HVAC system leading to the systems described herein. In some cases, one or more dampers of the systems described herein (and optionally in an adjoining HVAC system) can work together in concert, for example, where one damper would open while another closes to route air to the systems described herein and to maintain an approximately constant air flow (and/or upstream pressure) through the systems described herein and/or through the HVAC system(s).

In some cases, airflow can be directed through the systems for capturing $CO_2$ described herein using one or more fans. One or more fans can be coupled to an inlet and/or one or more fans can be coupled to an outlet of the system to draw the inlet air stream into and/or through the system. The fan(s) can be located in one or more inlet and/or outlet ducts coupled to an air process zone containing a portion of the sorbent wheel, or can be located within the air process zone. In some cases, the fan(s) require less energy than typical HVAC blower fans. In other cases, the inlet air flow is provided by an external source (e.g., air flow through a duct of an HVAC system coupled to the air process zone) and these additional fan(s) are not needed.

In some cases, the systems and methods described herein include one or more $CO_2$ sensors located within the system. The $CO_2$ sensor(s) can be used to detect an amount or concentration of $CO_2$ in any zone of the system (e.g., the air process zone, the humid zone, and/or the drying zone). In some cases, the $CO_2$ sensors can be coupled to a processor and computer memory to control one or more components of the system based on information from the $CO_2$ sensor(s), for example in closed-loop feedback. For example, information from a $CO_2$ sensor can be used to control a position of a damper, wherein a high and/or low concentration of $CO_2$ can trigger the opening or closing a damper to adjust the flow rate of the inlet air stream in the systems described herein. In another example, information from a $CO_2$ sensor can be used to control a fan, such as turning a fan on or off, or changing the speed of a variable speed fan.

In the systems and methods described herein, a $CO_2$ storage material can be used to store the $CO_2$ after it has been released (e.g., desorbed) from the sorbent material. $CO_2$ is desorbed from the humidity swing sorbent material in the humid zone, and the $CO_2$ storage material can be located within the humid zone. In some cases, the $CO_2$ storage material can be located proximate to the humid zone, where the $CO_2$ released in the humid zone can be captured by the $CO_2$ storage material. In some cases, the $CO_2$ storage material can react with the released $CO_2$, and the $CO_2$ storage material can be converted into a $CO_2$-containing material. In some cases, the reaction will also release water from the $CO_2$ storage material, for example, into the humid zone. In other words, in some cases, the $CO_2$ storage material can react with the released (e.g., desorbed) $CO_2$ to produce water. For example, the $CO_2$ storage material can be a hydroxide (e.g., metal hydroxide, calcium hydroxide, magnesium hydroxide, sodium hydroxide, or potassium hydroxide), or other chemical that is capable of chemically storing the released (e.g., desorbed) $CO_2$. The $CO_2$ storage material can be in the form of sheets, pellets, powder, particulates, or other form factor. In some cases, the $CO_2$ storage material is relatively dry (or is not wet) when being installed in the system (but it can absorb some moisture in the humid zone).

In some embodiments, the $CO_2$ storage material is a hydroxide, which produces a water molecule for each $CO_2$ molecule that it reacts with. In some cases, the $CO_2$ storage material is contained within the humid zone of the systems and methods described herein, and the $CO_2$ storage material produces water when reacting with the released (e.g., desorbed) $CO_2$ which is used to add water to the environment of the humid zone.

In some cases, a system for capturing $CO_2$ can include: an inlet air stream and an outlet air stream in an air process zone; a sorbent wheel including a sorbent material; a humid zone proximate to the sorbent wheel; and a $CO_2$ storage material proximate to the humid zone. The sorbent wheel can be configured to rotate such that a portion of the sorbent material is alternatively exposed to the inlet air stream in the air process zone and to the humid zone. The sorbent material can also be a humidity-swing sorbent material configured to capture (e.g., adsorb) $CO_2$ from the inlet air stream when in the air process zone, and to release the $CO_2$ when it is exposed to humid air in the humid zone. The $CO_2$ storage material can be configured to capture and store the $CO_2$ (permanently or temporarily) after it is released by the sorbent material in response to being exposed to humid air in the humid zone.

In some cases, the system and methods described herein further include air filters to capture volatile organic chemicals (VOCs) and/or particles from the air being processed. In some cases, the system and methods described herein further include one or more UV light sources (e.g., to produce UV-C light) to disinfect the air being processed. For example, the UV light can disinfect viruses and/or bacteria from the inlet air stream. In some cases, the systems and methods described herein further include additional filtration or disinfection methods, such as HEPA filtration, ionization, plasma, or other aerosolized disinfectant. For example, one or more such additional filtration or disinfection units can be coupled to the inlet and/or the outlet of the air process zone, to the humid zone, and/or to the optional drying zone of the systems described herein. In some cases, one or more such additional filtration or disinfection units can be located within the air process zone, humid zone, and/or optional drying zone of the systems described herein.

Figure 1A:
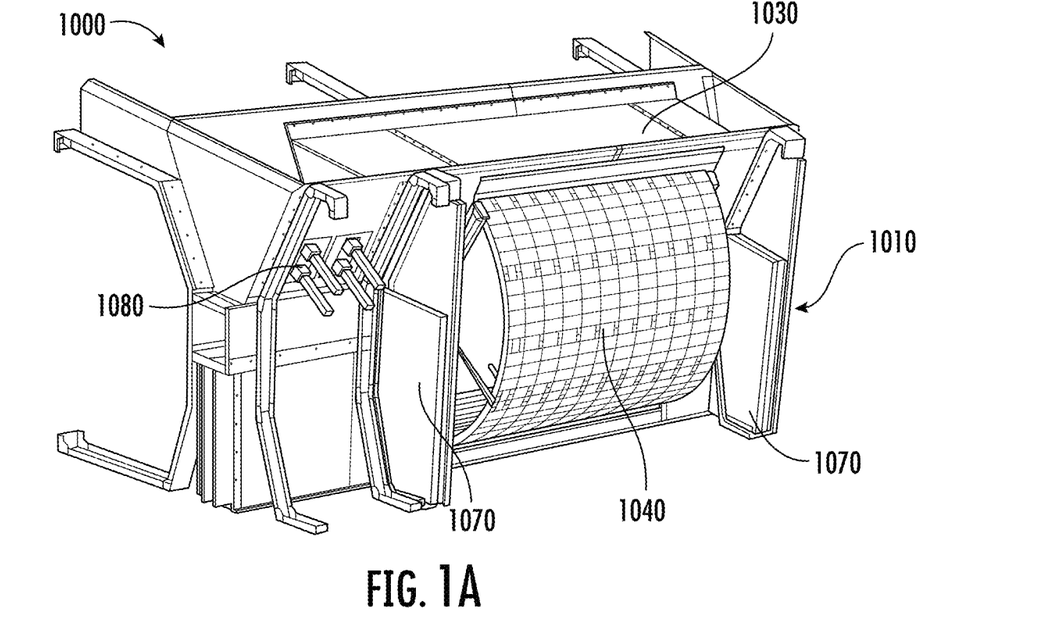
FIGS. 1A-1C and 2-4 show schematics of example systems for capturing $CO_2$ from an air stream, in accordance with some embodiments.
Figure 1B:
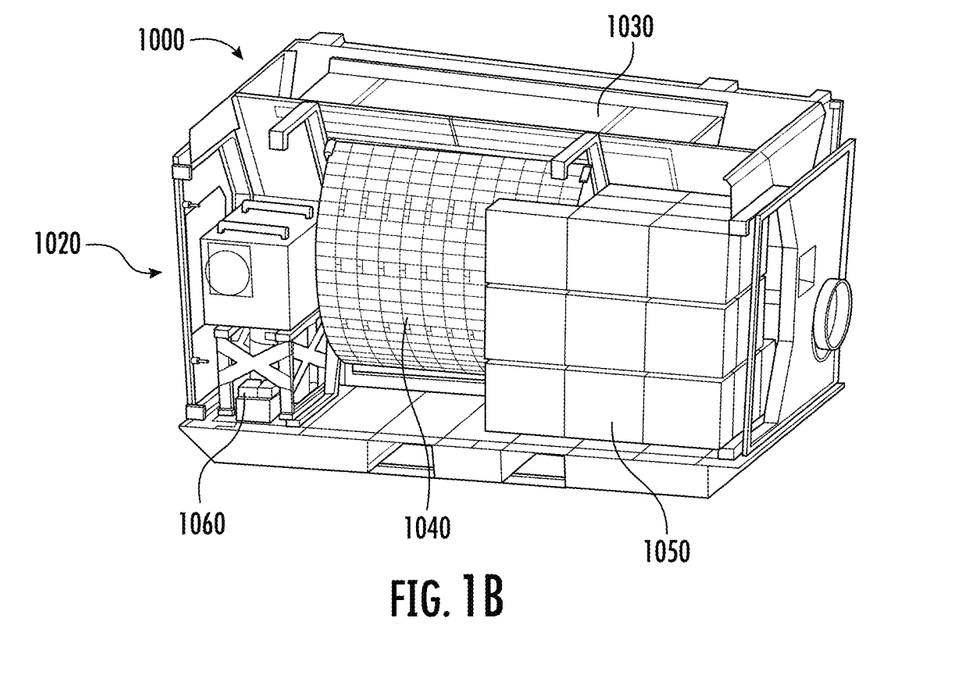

FIGS. 1A and 1B show schematics of an example of a system 1000 for capturing $CO_2$ from an air stream. An inlet air stream is directed through a process air zone 1010. The sorbent material 1040 is arranged in a sorbent wheel (i.e., is configured in a rotating assembly) which rotates the sorbent material 1040 through the process air zone 1010 and the humid zone 1020. A more detailed view of the sorbent material 1040 arranged in panels in the sorbent wheel is described in FIG. 5. FIG. 1A shows the process air zone 1010 in front (with humid zone 1020 in back), while FIG. 1B is an opposite view compared to FIG. 1A, showing the humid zone 1020 in front. Optional drying zone 1030 can be arranged such that the sorbent material 1040 rotates through the drying zone 1030, after rotating through the humid zone 1020 and before rotating into the process air zone 1010. In this example, the process air zone 1010, the humid zone 1020, and the optional drying zone 1030 are each separated from one another so that no (or a small fraction of) air, humidity, and/or $CO_2$ can leak (or be exchanged, or be shared) between the zones. In some cases, the separation of the zones is achieved using physical seals, and in other cases, air curtains can be used. For example, brushes or other mechanical separation elements (e.g., flaps, foam, or rubber sealing elements) that are in contact with the outside, the front, and/or the back face of the wheel can be placed between the zones to prevent mixing of gases and moisture between them. The brushes or other mechanical separation elements can press against the wheel creating a separator for the air flow. In some cases, a relatively low spinning speed (e.g., about 0.5 revolutions per hour (RPH), or from about 0.1 to about 1 RPH, or from about 0.1 to about 10 RPH) is used in systems with the brushes or other mechanical separation elements, which can also help keep the zones separated. Additionally, airflow within system 1000 can be directed to minimize mixing. For example, airflow in the humid zone can flow in the opposite direction as airflow in the air process zone.

Sorbent material 1040 of system 1000 can be arranged to pass through the process air zone 1010, the humid zone 1020, and the optional drying zone 1030 using a fixture that is configured to rotate the sorbent wheel about an axis of rotation. The fixture can use any rotation means. For example, the sorbent wheel can be motorized and use electric motors and optionally gears. As can be seen in system 1000, due to the rotation, a portion of the sorbent material 1040 is in the process air zone within a first angular range, while another portion of the sorbent material 1040 is in the humid zone within a second angular range. This allows system 1000 to continuously capture $CO_2$ from the inlet air stream and release (e.g., desorb) the captured $CO_2$ into the humid zone.

Figure 1C:
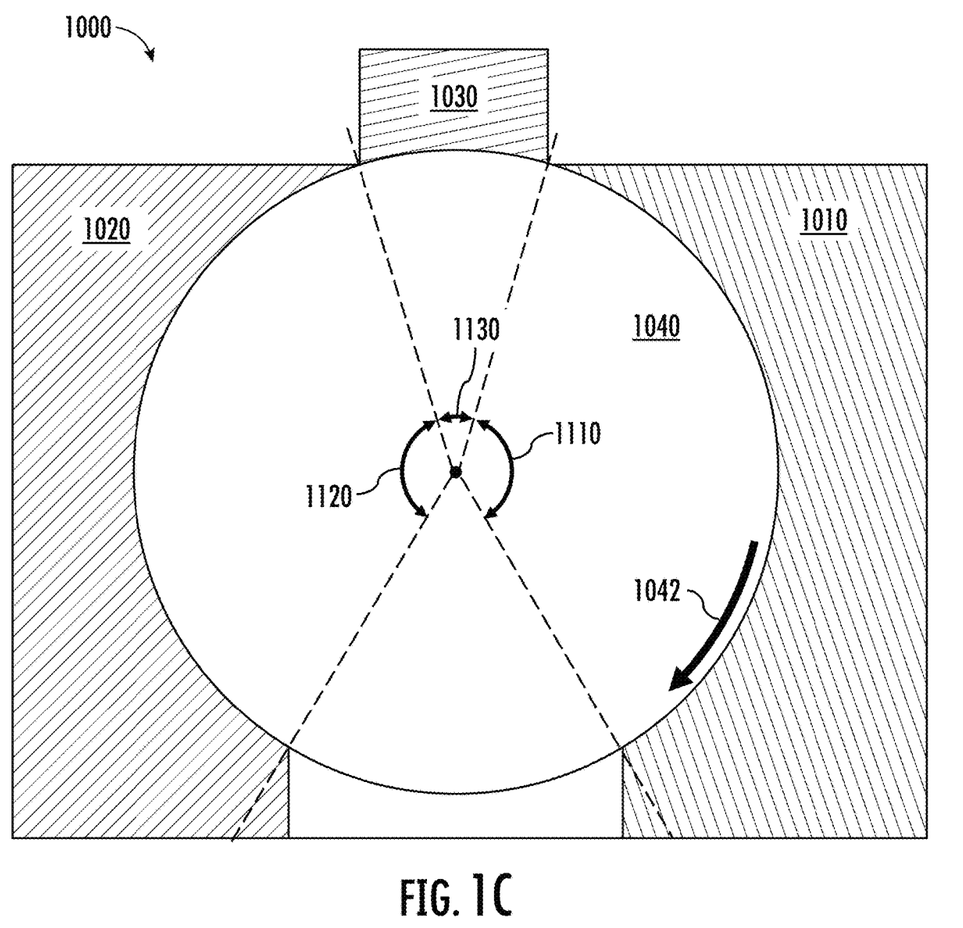

FIG. 1C shows a simplified side view schematic of system 1000 for capturing $CO_2$ from an air stream (not drawn to scale). The sorbent material 1040 is in a fixture wheel that rotates in direction 1042. A first portion of the sorbent material 1040 within angular range 1110 (e.g., a first angular range) is in the process air zone 1010, while a second portion of the sorbent material 1040 within angular range 1120 is in the humid zone 1020. In cases including the optional drying zone 1030, a third portion of the sorbent material 1040 within angular range 1130 is also in the optional drying zone 1030. In this example, the first portion of the sorbent material 1040 within angular range 1110 is approximately 180 degrees apart from the second portion of the sorbent material 1040 within angular range 1120.

The first portion of the sorbent material 1040 within angular range 1110 can extend or span approximately 90 degrees, or approximately 180 degrees, or approximately 270 degrees, or a range from approximately 90 degrees to approximately 270 degrees, around the circumference of the sorbent material 1040, depending on the diameter of the rotatable sorbent material 1040 and the dimensions of the air process zone 1010. The second portion of the sorbent material 1040 within angular range 1120 can extend or span approximately 90 degrees, or approximately 180 degrees, or approximately 270 degrees, or a range from approximately 90 degrees to approximately 270 degrees, around the circumference of the sorbent material 1040, depending on the diameter of the rotatable sorbent material 1040 and the dimensions of the humid zone 1020. In some cases, the third portion of the sorbent material 1040 within angular range 1120 can extend or span approximately 30 degrees, or approximately 90 degrees, or approximately 180 degrees, or a range from approximately 30 degrees to approximately 180 degrees, around the circumference of the sorbent material 1040, depending on the diameter of the rotatable sorbent material 1040 and the dimensions of the optional drying zone 1030.

The sorbent material 1040 rotates in direction 1042, such that the first portion of the sorbent material 1040 is initially within angular range 1110 to capture or adsorb $CO_2$, and, after rotating (e.g., approximately 90 degrees, or approximately 180 degrees, or approximately 270 degrees), the first portion of the sorbent material 1040 rotates to be within angular range 1120 where it can release or desorb the $CO_2$ within the humid zone.

Returning to FIGS. 1A and 1B, system 1000 can also include $CO_2$ storage material 1050, which is located inside of the humid zone 1020 in this example. The $CO_2$ storage material 1050 can be a hydroxide (e.g., metal hydroxide, calcium hydroxide, or potassium hydroxide), or other chemical that is capable of chemically storing the released (e.g., desorbed) $CO_2$. The $CO_2$ storage material 1050 can be in the form of sheets, pellets, powder, particulates, or other form factor. The $CO_2$ storage material 1050 can store the released $CO_2$ permanently or temporarily. For example, the $CO_2$ storage material 1050 can be removed from the system to be utilized in another application or discarded, and replaced with fresh $CO_2$ storage material 1050. For example, after being used in the systems described herein, $CO_2$ storage material 1050 containing the captured $CO_2$ can be utilized for the production of concrete, carpeting, roofing, cosmetics, and pharmaceuticals. In other cases, the $CO_2$ storage material 1050 can be regenerated and reused. In some cases, the $CO_2$ storage material 1050 can be regenerated within the system 1000, or can be removed from the system 1000 for regeneration. In some cases, it can be advantageous to remove the $CO_2$ storage material 1050 from the system for regeneration due to the high temperatures required.

In some cases, $CO_2$ storage material 1050 is located proximate to (e.g., near, next to, adjacent to, in contact with, or inside) the humid zone 1020, such that it can store $CO_2$ released from the sorbent material 1040 in the humid zone 1020. In some cases, the $CO_2$ storage material 1050 is located proximate to the humid zone 1020, such that it can provide water to the humid zone 1020 (e.g., due to reactions with $CO_2$). In some cases, the $CO_2$ storage material 1050 is located in the humid zone 1020. In other cases, the $CO_2$ storage material 1050 is located in a separate enclosure that is coupled to the humid zone 1020 such that it can store $CO_2$ released from the sorbent material 1040 and/or can provide water to the humid zone 1020 (e.g., due to reactions with $CO_2$). For example, the separate enclosure can be coupled to the humid zone 1020 using one or more conduits, openings, or vents. In some cases, system 1000 is configured such that a high concentration of $CO_2$ is formed (or builds up) in the humid zone 1020. In some cases, a high concentration of $CO_2$ improves the reaction efficiency of the $CO_2$ storage material 1050 to react with and store the $CO_2$. The two-step approach of capture and storage described herein can be advantageous, since in one step the sorbent material 1040 can efficiently capture (e.g., adsorb) the $CO_2$ from an inlet airstream, and in another step the $CO_2$ storage material 1050 can store (e.g., react with) the $CO_2$ (either permanently or temporarily, as described herein).

System 1000 can also include a dehumidifier/humidifier 1060. Dehumidifier/humidifier 1060 is either in the humid zone 1020 or is coupled to the humid zone 1020, and can be used to control the humidity in the humid zone 1020. For example, at start up, the dehumidifier/humidifier 1060 can be used to add humidity to the humid zone 1020. In some cases (e.g., where the $CO_2$ storage material 1050 is configured to release water), the humidifier is only used at start up. During operation, the dehumidifier/humidifier 1060 can be used to remove excess moisture from (or dehumidify) the humid zone 1020, for example, in cases where the $CO_2$ storage material 1050 generates water upon reacting with the released (e.g., desorbed) $CO_2$. In some cases, the dehumidifier/humidifier 1060 can control the humidity to a desired level, such as to optimize the reaction efficiency of the $CO_2$ sorbent material and/or the $CO_2$ storage material. The dehumidifier/humidifier 1060 in the humid zone 1020 can include one or more of a dehumidifier, a cool mist humidifier (to reduce added heat), a water reservoir, and a drain pump to pump excess water out of system 1000.

System 1000 can also contain air filters 1070 (e.g., placed at an inlet and/or outlet of the process air zone 1010) to capture volatile organic chemicals (VOCs) and/or particles from the air being processed. In some cases, system 1000 can also include one or more UV lights 1080 (e.g., UV-C light) to disinfect the air being processed. Filters 1070 and UV lights 1080 can together reduce the amount of odors, particles, and other contaminants (e.g., bacterial and viral) in the processed air stream.

In some embodiments, the systems and methods described herein (e.g., system 1000) only use one inlet air stream. This is in contrast with other continuous carbon capture systems, which require a second air stream to release (e.g., desorb) $CO_2$ from the sorbent material (or regenerate the sorbent material). The $CO_2$ storage material (e.g., housed within the humid zone) of the continuous carbon capture systems and methods described herein alleviates the need for a second air stream. Additionally, in some cases, the $CO_2$ storage material releases water upon reaction with $CO_2$, which advantageously helps maintain humidity in the humid zone. The systems and methods described herein use humidity-swing sorbent materials that also do not require added heat to release (e.g., desorb) $CO_2$ from the sorbent material. In some embodiments, the systems and methods described herein (e.g., system 1000) do not include a source of heat (e.g., a heater, or a source of hot air or steam). This is also in contrast with other continuous carbon capture systems, which require a heat source (e.g., hot air, or steam) to release (e.g., desorb) $CO_2$ from the sorbent material (or regenerate the sorbent material).

In some embodiments, humid zone 1020 in system 1000 has an airflow, for example created by one or more fans. The airflow can be a closed airflow loop, such that no (or little) $CO_2$ or water leaks (or escapes) from the humid zone 1020. In such cases, the moisture in the air within humid zone 1020 is prevented from leaking (e.g., into the other zones or the surrounding environment), and the water content in the humid zone 1020 is maintained. For example, the $CO_2$ storage material 1050 can include a hydroxide (e.g., calcium hydroxide, or magnesium hydroxide) which converts to a carbonate (e.g., calcium carbonate, or magnesium carbonate) upon reaction with the $CO_2$ in the humid zone 1020 causing water to be released into the humid zone 1020. The $CO_2$ sorbent material 1040 can be a humidity-swing sorbent material that releases (e.g., desorbs) more efficiently at high humidities. Therefore, a closed loop airflow in humid zone 1020 allows for a reduction of water usage while maintaining a high desorption efficiency from the $CO_2$ capture material 1040.

In some embodiments, the drying zone 1030 also has an airflow, for example created by one or more fans. For example, a fan and a dehumidifier in the drying zone 1030 can be used to dry the $CO_2$ capture material 1040 before rotating back into the process air zone 1010. The airflow can be a closed airflow loop, in some cases, such that water in the drying zone is prevented from leaking into other zones or the environment. In some cases, the dehumidifier in the drying zone 1030 also drains to the same water reservoir and drain pump that are used in the dehumidifier/humidifier 1060. In other cases, the drying zone has an open airflow, where the one or more fans promotes the transfer of water from the sorbent material 1040 to the dehumidifier in the drying zone 1030, and the water in the drying zone 1030 can escape into the environment, but the water in the drying zone 1030 is prevented from leaking into the air process zone 1010 and/or into the humid zone 1020.

Figure 2:
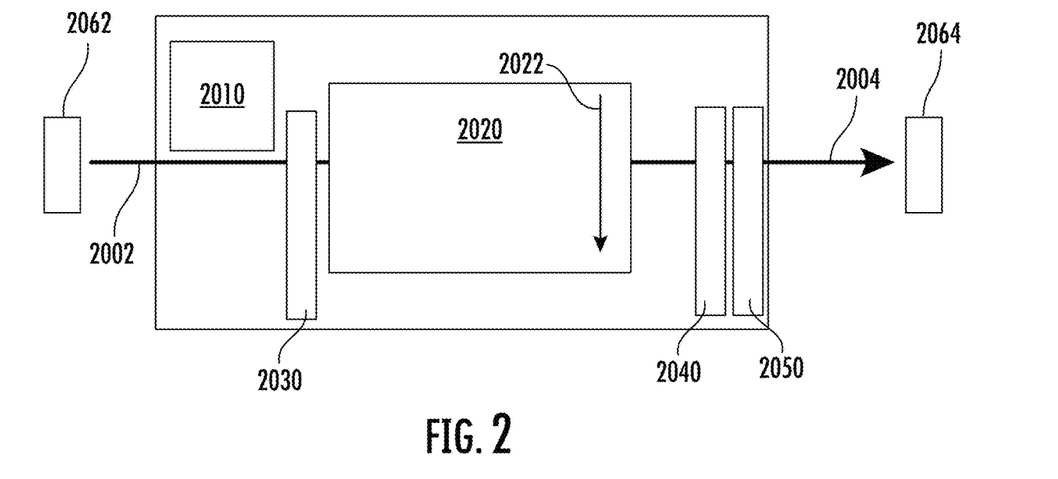

FIG. 2 shows a schematic of an example of a system 2000, representing components related to the process air zone 1010 in system 1000. In system 2000, an inlet air stream 2002 (e.g., from a room or an HVAC system) passes through a UV disinfection zone 2010, for example, using UV light similar to UV light 1080 in system 1000. In some cases, the inlet air stream 2002 contains substantially dry air, for example, that is diverted from a duct of a building heating, ventilation, and air conditioning (HVAC) system. The inlet air stream 2002 then passes through a filter 2030 (e.g., a filter with a minimum efficiency reporting value (MERV) of 7), similar to filter 1070 in system 1000. The $CO_2$ sorbent material 2020 (e.g., a $CO_2$ sorbent wheel) is shown, which can rotate continuously (e.g., in rotation direction 2022). For example, the $CO_2$ sorbent material 2020 in system 2000 can be configured as shown in sorbent material 1040 in system 1000. After passing through the $CO_2$ sorbent material 2020, the air stream passes through a set of filters 2040 and 2050 (e.g., a filter that reduces VOCs and/or odors, or a filter with a MERV of 13). The outlet air stream 2004, which has a $CO_2$ concentration that is below that of the inlet air stream, and that has been filtered, can then be returned to the room or to the HVAC system. Filters 2030, 2040 and/or 2050 can also utilize additional filtration or disinfection methods, such as high efficiency particulate air (HEPA) filtration, ionization, plasma, or other aerosolized disinfectant. For example, an aerosolized disinfectant can be sprayed by one or more of filters 2030, 2040, and 2050 into the inlet air stream to reduce the concentration of pathogens therein. The aerosolized disinfectant can be added to the inlet air stream before or after the sorbet wheel, and can then be carried with the inlet air stream to locations downstream. The aerosolized disinfectant can remain within the system 2000, or can exit the system 2000 with the outlet air stream 2004.

In some cases, airflow can be directed through system 2000 using fans 2062 and/or 2064. Optional fan(s) 2062 and/or 2064 can be positioned to draw the inlet air stream into the system. For example, fan 2062 can be coupled to an inlet and/or fan 2064 can be coupled to an outlet of the system. The fan(s) can be located in one or more inlet and/or outlet ducts (not shown) coupled to the process air zone containing a portion of the sorbent wheel 2020, or can be located within the process air zone to draw the inlet air stream into the system. In other cases, the fans 2062 and 2064 can be omitted. For example, fans 2062 and 2064 can be omitted when the inlet airstream is provided by a duct of an HVAC system coupled to the air process zone.

Figure 3:
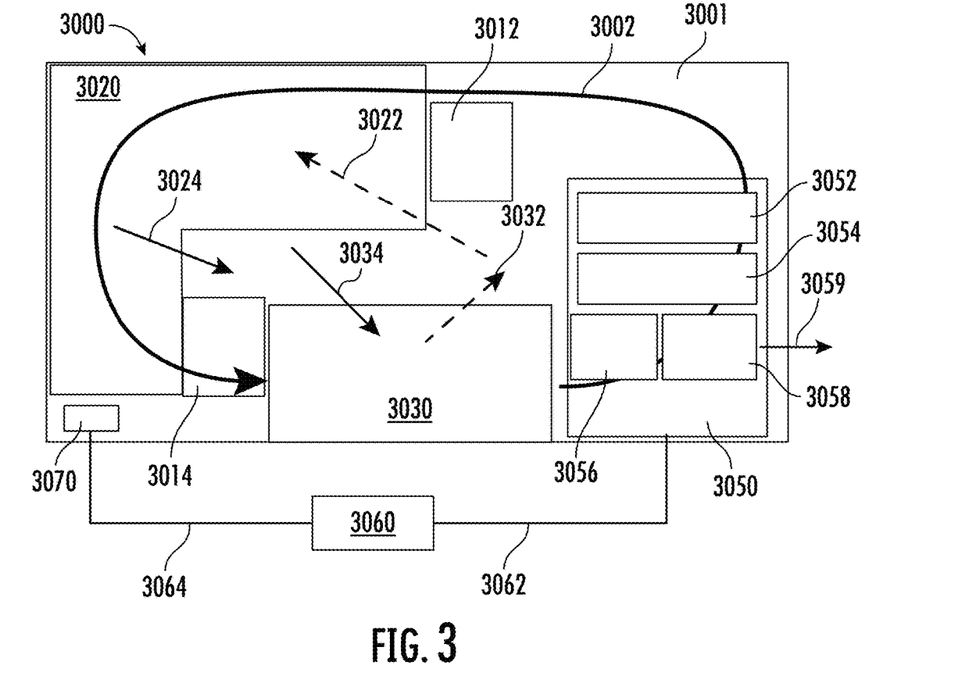

FIG. 3 shows a schematic of an example of a system 3000, representing components related to the humid zone 1020 in system 1000. The components shown in FIG. 3 can be located within the humid zone, or can be located proximate to the humid zone such that water and $CO_2$ can be exchanged from the components to an environment 3001 of the humid zone. A closed airflow loop 3002 (or circular airflow) moves water 3024 from the $CO_2$ storage material 3020 to the environment 3001 of the humid zone, and moves water 3034 from the environment 3001 to the $CO_2$ sorbent material 3030 (e.g., a rotatable sorbent wheel). Adding water 3034 to the $CO_2$ sorbent material causes captured $CO_2$ 3032 (e.g., adsorbed $CO_2$) to release (e.g., desorb) from the $CO_2$ sorbent material 3030. The closed airflow loop 3002 then brings the released $CO_2$ 3022 in the environment 3001 to the $CO_2$ storage material 3020 where it will react to be stored. In this example, the $CO_2$ storage material 3020 is a hydroxide that releases water 3024 into environment 3001 of the humid zone upon reacting with the released $CO_2$ 3022. The release of the water 3024 from the $CO_2$ storage material 3020 to the environment 3001 of the humid zone can then cause the above cycle to repeat. In some cases, either instead of or in addition to water being released from the $CO_2$ storage material 3020, water can be added to the environment 3001 of the humid zone using the humidity control system 3050. Fans can be arranged to form the closed airflow loop and promote the exchange of water from the $CO_2$ storage material 3020 (and in some cases from the humidity control system 3050) to the $CO_2$ sorbent material 3030, and to transfer released $CO_2$ 3032 from the $CO_2$ sorbent material 3030 to the $CO_2$ storage material 3020.

Continuing with FIG. 3, in some cases, a humidity control system 3050 (e.g., similar to the dehumidifier/humidifier 1060 of system 1000) can also be coupled to (or located within) the humid zone. The humidity control system 3050 can control the humidity of humid air in the humid zone to be, for example, from 70% RH to 95% RH, or from 70% RH to 90% RH, or from 70% RH to 85% RH, or from 75% RH to 95% RH. In some cases, the circular airflow 3002 also moves air through the humidity control system 3050 to humidify and/or dehumidify the air within the environment 3001 of the humid zone. The humidity control system 3050 can include a dehumidifier 3052, a humidifier 3054, a water tank 3056, and/or a drain pump 3058, in some cases. For example, the drain pump 3058 can be used to remove excess water 3059 from the system.

In some cases, the humidity control system 3050 is coupled to one or more processors 3060, and optionally to one or more humidity sensors 3070. Processor(s) 3060 can be located in the cloud, or locally to the system 3000, and can be coupled to memory that can be located in the cloud, or locally to the system 3000. Processor(s) 3060 can be coupled to the humidity control system 3050 and optionally the humidity sensor(s) 3070 using wired or wireless couplings 3062 and 3064. The humidity control system can be controlled using the processor(s) 3060, optionally based on feedback from the sensor(s) 3070, to keep the relative humidity (RH) in the environment 3001 of the humid zone at a certain level, e.g., from 80% RH to 90% RH. In some embodiments, the humidity control system 3050 can also be used to dry out the humid zone. Such a mode can be useful, for example to stop the buildup of $CO_2$ in the humid zone environment 3001 so that the device is safe to open (e.g., for service). In such cases, the dehumidifier 3052 can be used to remove water from the environment 3001 of the humid zone, the water can be collected in the water tank 3056, and the water 3059 can be removed using the drain pump 3058.

In some cases, the systems described herein use humidity-swing sorbent materials (e.g., sorbent material 1040 in FIGS. 1A-1B, 2020 in FIG. 2, 3030 in FIG. 3, and 4020 in FIG. 4) that also do not require added heat to release (e.g., desorb) $CO_2$ from the sorbent material. In some embodiments, the humid zones of the systems and methods described herein do not include a source of heat. In other words, in some cases, the humid zones of the systems and methods described herein do not include a heater, or a source of hot air or steam. In such cases where there is no source of heat (e.g., no heater, or no hot air or steam inlets), the environment of the humid zone can have a temperature at or near room temperature. For example, the environment of the humid zone (e.g., environment 3001 in FIG. 3) can have a temperature of about 25° C., or from 15° C. to 50° C. This ability to operate without a heat source is in contrast with existing carbon capture systems, which require a heat source (e.g., hot air, or steam) to release (e.g., desorb) $CO_2$ from the sorbent material (or regenerate the sorbent material).

Figure 4:
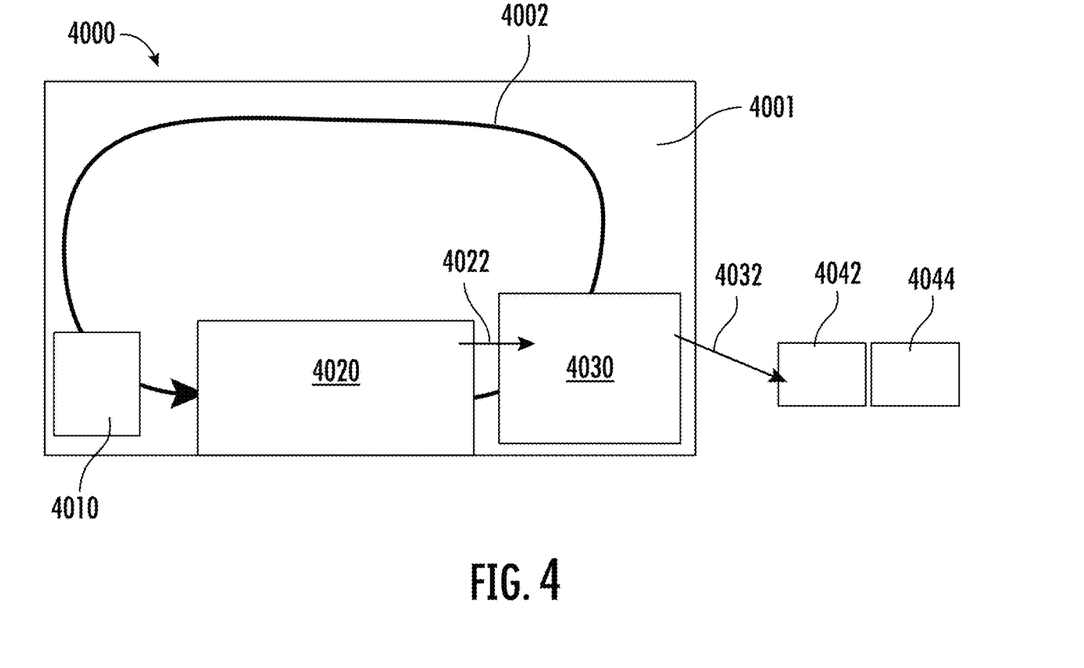

FIG. 4 shows a schematic of an example of a system 4000, representing components related to the drying zone 1030 in system 1000. The components shown in FIG. 4 can be located within the drying zone, or can be located proximate to the drying zone such that water can be exchanged from the components to an environment 4001 of the drying zone. The drying zone can be configured to remove water 4022 from the $CO_2$ sorbent material 4020 (e.g., a rotatable sorbent wheel) after the $CO_2$ sorbent material 4020 is exposed to humid air in the humid zone, and before being exposed or re-exposed to the inlet air stream (e.g., inlet air stream 2002 in FIG. 2). A closed airflow loop 4002 (or circular airflow) moves air from the $CO_2$ sorbent material 4020 through a dehumidifier 4030, thereby reducing the amount of water in the $CO_2$ sorbent material. The water 4032 removed by the dehumidifier 4030 can then be pumped using a drain pump 4044, for example, to a water reservoir 4042, or to be discarded. The dehumidifier 4030, water reservoir 4042, and drain pump 4044 can be part of a humidity control system in the humid zone (e.g., dehumidifier 3052, water reservoir 3056, and drain pump 3058 of humidity control system 3050 in FIG. 3), or can be separate components for the drying zone. One or more fans 4010 can be arranged to form the closed airflow loop 4002 and promote the movement of water 4022 from the $CO_2$ sorbent material 4020 to the dehumidifier 4030.

Figure 5:
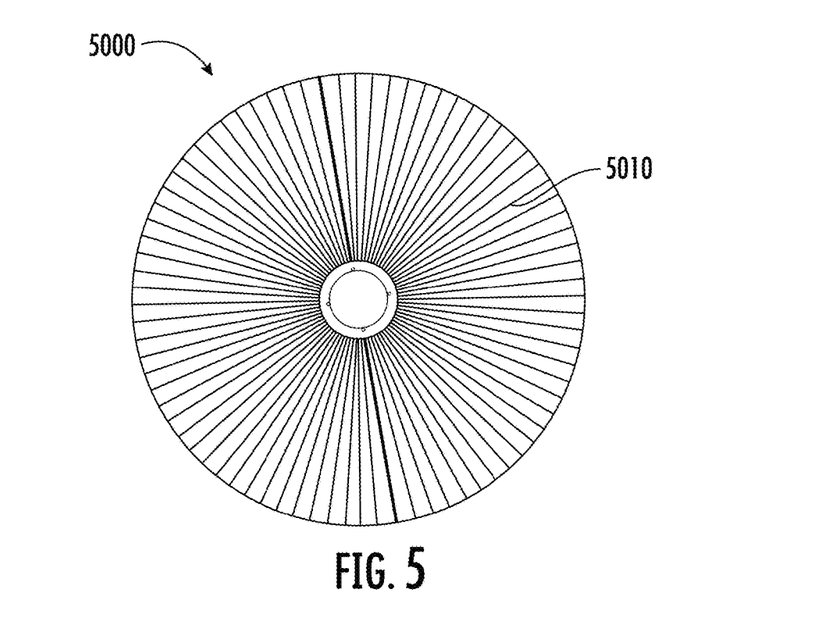
FIG. 5 shows an example of a $CO_2$ sorbent wheel including sorbent panels, where each sorbent panel contains $CO_2$ sorbent material, in accordance with some embodiments.

FIG. 5 shows an example of a $CO_2$ sorbent wheel 5000 including sorbent panels 5010, where each sorbent panel 5010 contains $CO_2$ sorbent material, in accordance with some embodiments. In this example, multiple sorbent panels 5010 are mounted radially inside a cylindrical housing of sorbent wheel 5000. In some cases, such as in system 1000, the air flow through the $CO_2$ sorbent material in $CO_2$ sorbent wheel 5000 is parallel to the axis of rotation of the $CO_2$ sorbent wheel 5000 (i.e., air flows along in the direction of the length of the cylindrical sorbent wheel 5000). This arrangement can be advantageous, because it can reduce a pressure drop across the $CO_2$ sorbent wheel 5000 while maintaining $CO_2$ capture efficiency.

Figure 6:
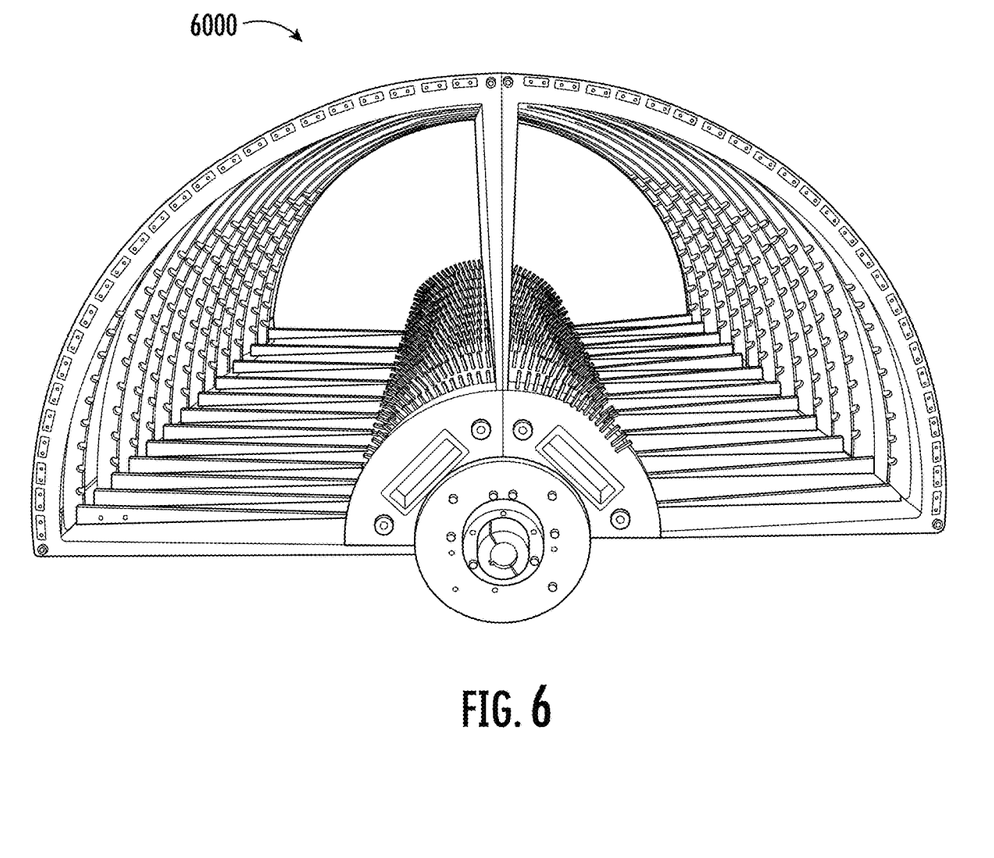
FIG. 6 shows a picture of an example of a portion of a fixture for a sorbent wheel, into which sorbent panels are arranged, in accordance with some embodiments.

FIG. 6 shows a picture of an example of a portion of a fixture for a sorbent wheel, into which sorbent panels will be arranged (e.g., similar to sorbent wheel 5000).

The $CO_2$ sorbent material (e.g., sorbent material 1040 in FIGS. 1A-1B, 2020 in FIG. 2, 3030 in FIG. 3, and 4020 in FIG. 4) can include any material that captures $CO_2$ (e.g., by adsorption). The sorbent can also be a humidity swing sorbent material that reversibly captures $CO_2$ (e.g., by adsorption) and releases the $CO_2$ (e.g., by desorption) from the sorbent in a humid environment. In some cases, the sorbent includes a fiber mesh. In some cases, the sorbent includes a fiber mesh with a high surface area (e.g., greater than 500 m$^2$/g, or from 600 m$^2$/g to 2000 m$^2$/g). In some cases, the sorbent includes a fiber mesh with small diameter fibers (e.g., with diameters about 300 nm, or less than 1 micron, or less than 500 nm, or less than 100 nm, or from 100 nm to 1 μm, or from 100 nm to 10 μm). The material of the fibers can be a polymer, such as polyethylene. In some cases, the fibers of the sorbent are biodegradable and/or are bioproduced (e.g., produced from renewable biomass sources, such as vegetable fats and oils, corn starch, straw, woodchips, sawdust, recycled food waste, etc.). In some cases, the fibers of the sorbent are produced using electrospinning, touch spinning, or melt spinning. For example, the sorbent can include an electrospun or touch-spun fiber mesh made from a biodegradable polymer (e.g., poly(lactic acid) (PLA) or polyester). In some cases, the sorbent can include fibers comprising polyester, polyethylene, poly(hydroxyalkanoate), poly(lactic acid), poly(F-caprolactone), or poly (ethylene terephthalate).

In some cases, the fibers comprise a core material (e.g., paper or polyethylene) that is coated with a coating material, and the coating material primarily captures the $CO_2$ (e.g., by adsorption). The coating material can "primarily" capture the $CO_2$ from the inlet air in cases where the coating material captures more $CO_2$ from the inlet air compared to the core material. In some cases, the material of the coating material has a higher rate of adsorption of $CO_2$ per unit area compared to the material that forms the core. This coating material can be coated onto the core material using dip coating, spray coating, or other methods. In some cases, the coating material adsorbs $CO_2$ more efficiently than the core material. For example, the coating material can comprise a chemical sorbent with amine groups to bind $CO_2$, a molecular sieve such as porous carbon, a ceramic, other sufficiently porous materials that can act as mechanical sorbents, or a metal-organic framework capable of $CO_2$ capture. The coating material can also comprise a polymer system which can include any of the coating materials described above. In other cases, the fibers can include a functionally active polymer, composite, or blend, and no coating is necessary.

In some cases, the systems and methods described herein are configured such that the $CO_2$ sorbent material can be replaced (or can be easily replaced, or can be readily replaced). $CO_2$ sorbent materials can degrade over time, which can cause their $CO_2$ capture efficiency to be reduced, and therefore it can be advantageous for systems to include mechanisms for replacing (or easily replacing, or readily replacing) the $CO_2$ sorbent material. For example, the sorbent material can be housed in a rotatable sorbent wheel that is sectional, such that it can be disassembled into sections (e.g., into 4 quadrants), thereby making it easier to remove and replace the $CO_2$ sorbent material in the sorbent wheel compared to having to replace the sorbent material in the entire wheel. In some cases, a fixture holding the sorbent material, for example, the whole sorbent wheel, can be removed from the system so that the $CO_2$ sorbent material can be replaced (or easily replaced, or readily replaced). In some cases, a section (e.g., a quadrant) of the sorbent wheel can be removed from the system to replace the $CO_2$ sorbent material therein. In some cases, attachment plates or frames can be mounted directly to an axle of the sorbent wheel, and wheel segments with sorbent panels can be removably secured to the attachment plates (e.g., with accessible bolts, clamps, or latches).

Figure 7:
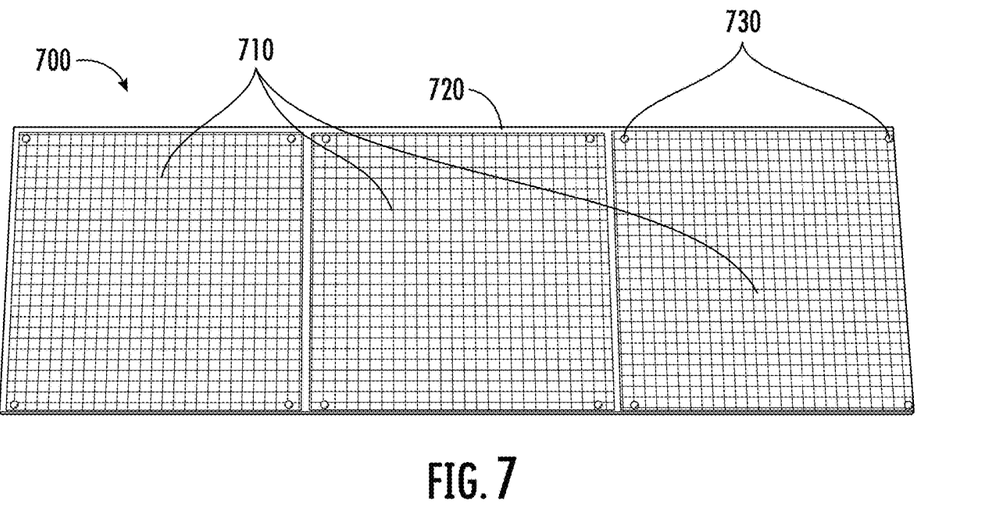
FIGS. 7 and 8 show examples of $CO_2$ sorbent panels, in accordance with some embodiments.

FIG. 7 shows an example of a $CO_2$ sorbent panel 700, in accordance with some embodiments. Sorbent panel 700 includes $CO_2$ sorbent material 710 (e.g., a mesh sorbent sheet), a frame 720 (e.g., made of plastic), and fasteners 730 (e.g., brads, rivets, or acorn nuts). The sorbent material 710 is coupled to the frame 720 using the fasteners 730. This example shows three pieces of sorbent material 710 coupled to frame 720, however, in other cases, there can be fewer or greater than three (e.g., 1, 2, 4, about 5, or about 10, or from 1 to 10) pieces of sorbent material 710 coupled to frame 720. Additionally, this example shows four fasteners 730 coupling each sorbent material 710 to frame 720, however, in other cases fewer or greater than four fasteners can be used to couple each sorbent material 710 to frame 720. Sorbent panel 700 can be inserted into a sorbent wheel (e.g., sorbent wheel 1040, 2020, 3030, 4020 and 5000 shown in FIGS. 1A-1C and 2-5).

Figure 8:
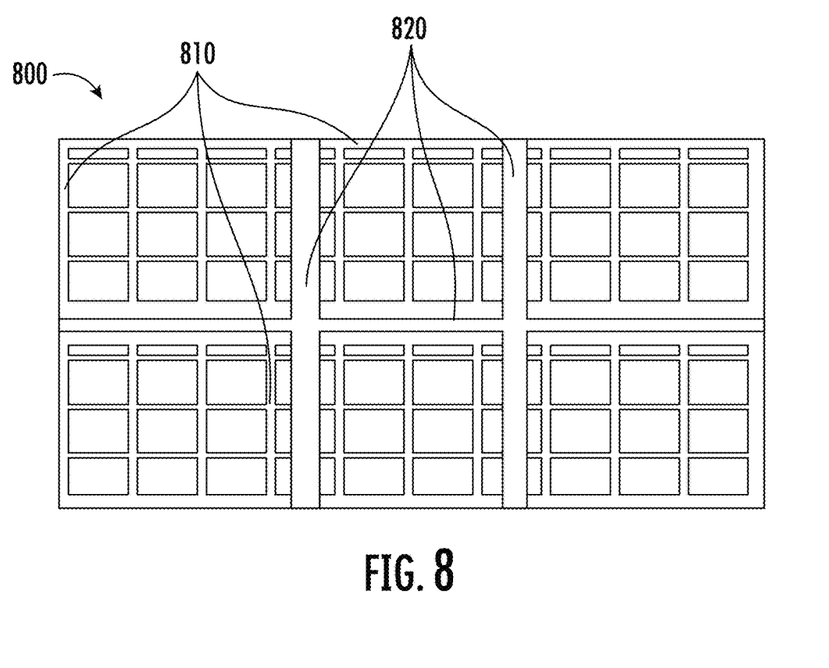

FIG. 8 shows an example of a $CO_2$ sorbent panel 800, in accordance with some embodiments. Sorbent panel 800 includes a frame 810 (e.g., made of plastic, aluminum, steel, or a composite material), and attachment beams 820 (e.g., made of a rigid material such as strong plastic, aluminum, steel, or a composite material). The frame 810 is supported by the attachment beams 820, which are arranged with one horizontal beam and two vertical beams. In other cases, the frame 810 can include a different number of attachment beams 820 in a different arrangement. One or more pieces of sorbent material (e.g., sorbent material 710 of FIG. 7) can be coupled to the sorbent panel 800, and the sorbent panel 800 can be inserted into a sorbent wheel, (e.g., sorbent wheel 1040, 2020, 3030, 4020 and 5000 shown in FIGS. 1A-1C and 2-5).

Figure 9A:
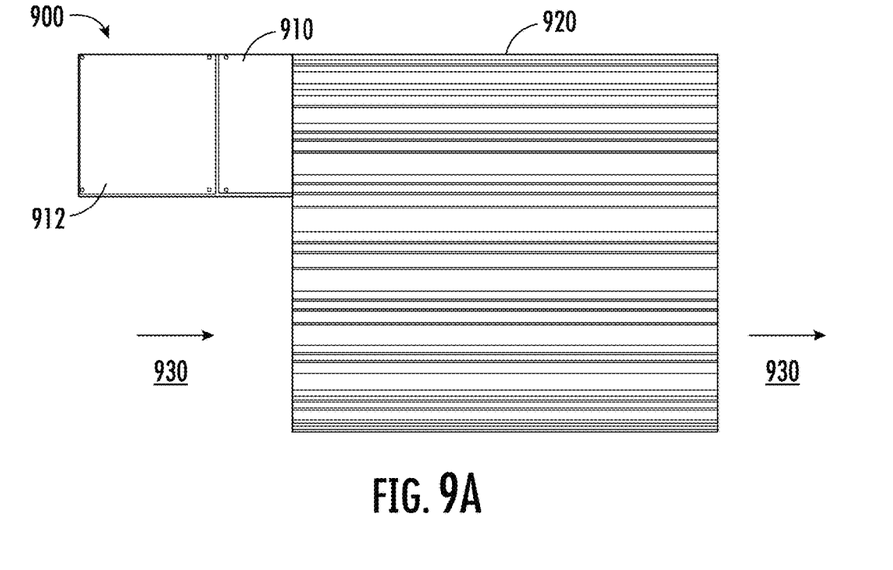
FIGS. 9A and 9B respectively show a side view and a three-dimensional view of an example of a $CO_2$ sorbent wheel including sorbent panels, in accordance with some embodiments.
Figure 9B:
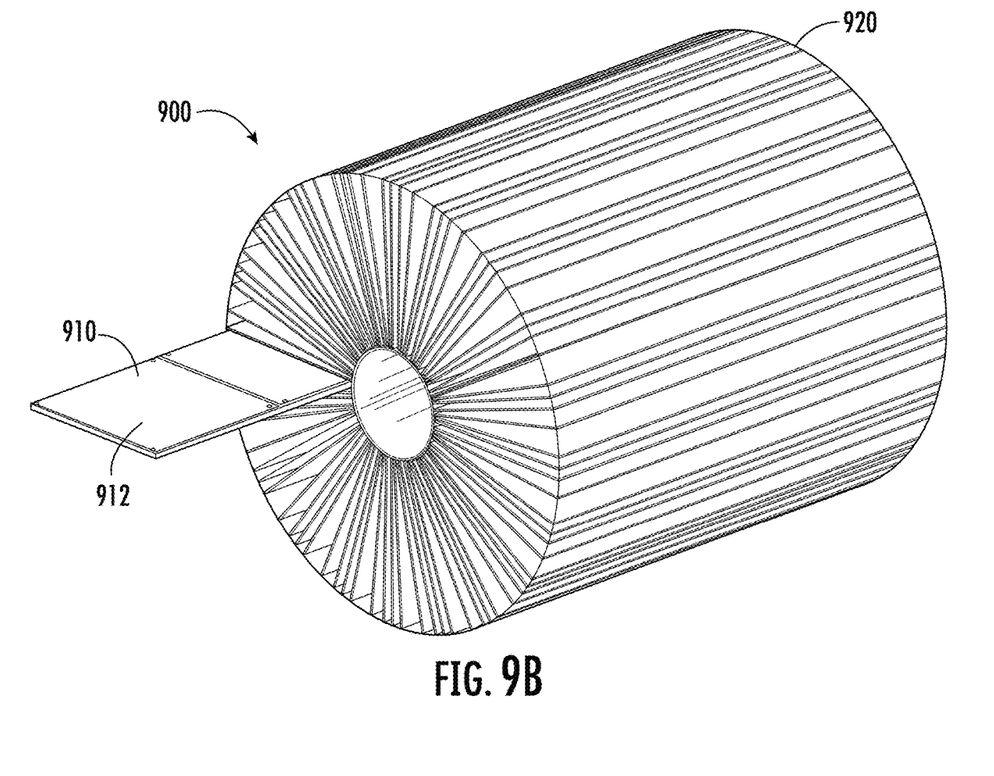

FIGS. 9A and 9B respectively show a top view and a three-dimensional view of an example of a $CO_2$ sorbent wheel 900 including sorbent panels 910, in accordance with some embodiments. Sorbent panels 910 are each similar to sorbent panel 700 shown in FIG. 7. Each sorbent panel 910 contains $CO_2$ sorbent material 912, for example, in the form of a fiber mesh, and/or a coating on the fiber mesh. In this example, multiple sorbent panels 910 are mounted radially inside a cylindrical housing 920 of sorbent wheel 900. In some cases, the air flow through the $CO_2$ sorbent material in $CO_2$ sorbent wheel 900 is in a direction 930 parallel to the axis of rotation of the $CO_2$ sorbent wheel 900 (i.e., air flows along in the direction 930, along the length of the cylindrical sorbent wheel 900). This arrangement can be advantageous, because it can reduce a pressure drop across the $CO_2$ sorbent wheel 900 while maintaining $CO_2$ capture efficiency.

Figure 10:
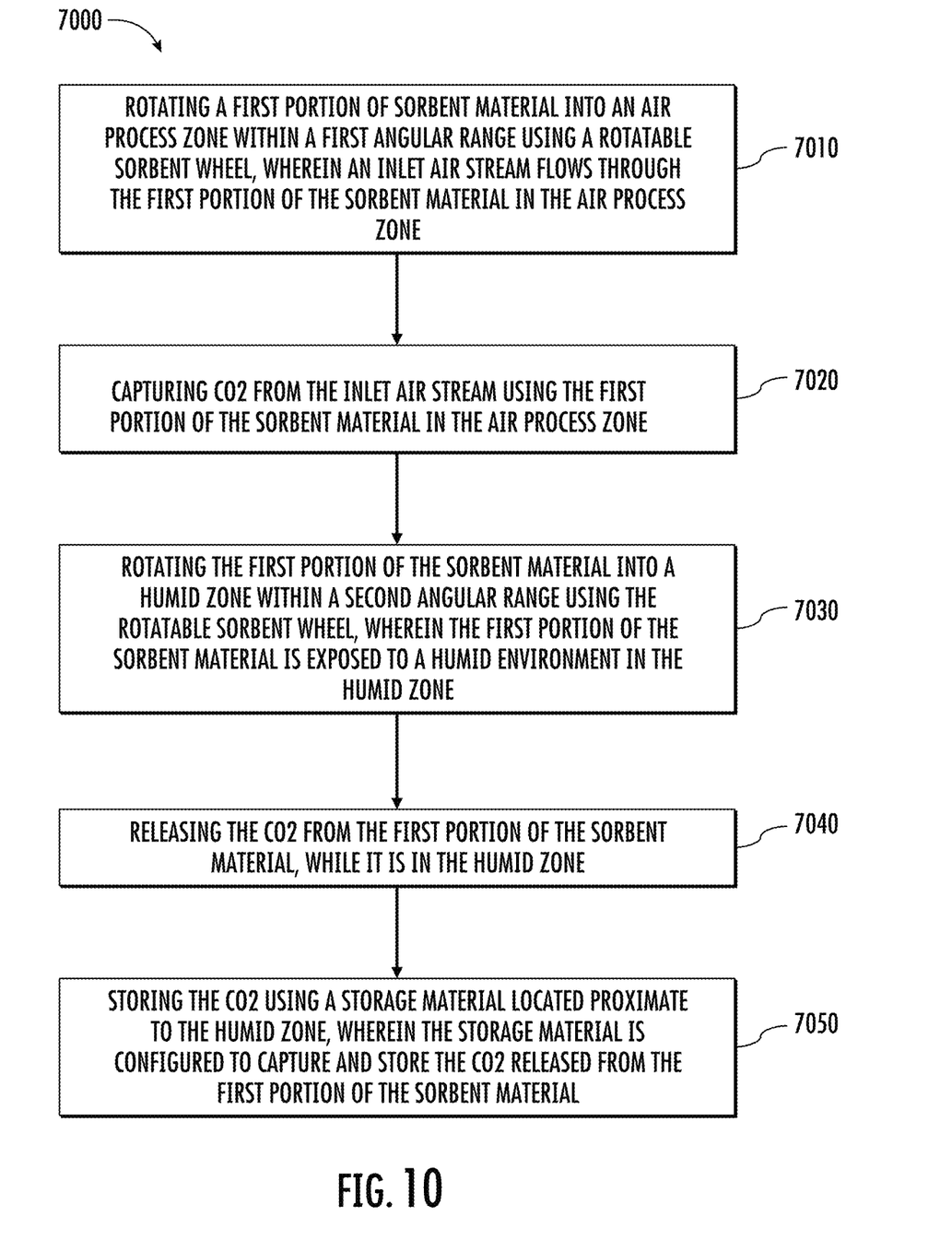
FIG. 10 shows an example of a method that can be performed using the systems described herein, in accordance with some embodiments.

FIG. 10 shows an example of a method 7000 that can be performed using the systems described herein (e.g., system 1000 in FIGS. 1A-1C). Method 7000 includes the following blocks. Block 7010 includes rotating a first portion of sorbent material into an air process zone within a first angular range (e.g., angular range 1110 in FIG. 1C) using a rotatable sorbent wheel, wherein an inlet air stream flows through the first portion of the sorbent material in the air process zone (e.g., air process zone 1010 in FIGS. 1A-1C). Block 7020 includes capturing $CO_2$ from the inlet air stream using the first portion of the sorbent material in the air process zone. Block 7030 includes rotating the first portion of the sorbent material into a humid zone within a second angular range (e.g., angular range 1120 in FIG. 1C) using the rotatable sorbent wheel, wherein the first portion of the sorbent material is exposed to a humid environment in the humid zone (e.g., humid zone 1020 in FIGS. 1A-1C). Block 7040 includes releasing the $CO_2$ from the first portion of the sorbent material, while it is in the humid zone. Block 7050 includes storing the $CO_2$ using a storage material located proximate to the humid zone, wherein the storage material is configured to capture and store the $CO_2$ released from the first portion of the sorbent material.

In some cases, method 7000 further includes rotating a second portion of the sorbent material using the sorbent wheel, wherein the second portion of sorbent material is located from approximately 90 degrees to approximately 270 degrees, or approximately 180 degrees, around a circumference of the sorbent wheel from the first portion of the sorbent material. In some cases, the second portion of the sorbent material is in the second angular range while the first portion of the sorbent material is in the first angular range. Additionally, in cases where wherein the second portion of sorbent material is located approximately 180 degrees around a circumference of the sorbent wheel, the second portion of the sorbent material is also in the first angular range while the first portion of the sorbent material is in the second angular range.

In some cases, method 7000 further includes rotating the first portion of the sorbent material into a drying zone within a third angular range using the rotatable sorbent wheel, wherein the third angular range is located between the first angular range and the second angular range, and wherein water is removed from the first portion of the sorbent material in the drying zone.

In some cases of method 7000, storing the $CO_2$ further includes: reacting the released $CO_2$ with the $CO_2$ storage material to convert the $CO_2$ storage material into a $CO_2$-containing material; and releasing water into the humid zone from the $CO_2$ storage material.

In some cases of method 7000, the $CO_2$ storage material is a hydroxide, which is converted to a carbonate material upon reaction with the released $CO_2$, and wherein the water is released into the humid zone due to the reaction.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A system for capturing $CO_2$, comprising:
   an air process zone configured to allow an inlet air stream to pass through the air process zone;
   a sorbent wheel comprising a sorbent material;
   a humid zone proximate to the sorbent wheel; and
   a $CO_2$ storage material proximate to the humid zone;
   wherein the sorbent wheel is configured to rotate such that a portion of the sorbent material is alternatively exposed to the inlet air stream in the air process zone and to the humid zone,
   wherein the sorbent material is configured to capture $CO_2$ from the inlet air stream when in the air process zone and to release the $CO_2$ when the sorbent material is exposed to humid air in the humid zone, and
   wherein the $CO_2$ storage material is configured to store the $CO_2$ after the $CO_2$ is released by the sorbent material in response to being exposed to the humid air in the humid zone.

2. The system of claim 1, wherein the inlet air stream comprises substantially dry air that is diverted from a duct of a building heating, ventilation, and air conditioning (HVAC) system.

3. The system of claim 1, further comprising a fan positioned to draw the inlet air stream into the system.

4. The system of claim 1, wherein the sorbent material comprises a humidity-swing sorbent material.

5. The system of claim 1, wherein the sorbent material comprises a fiber mesh, wherein fibers of the fiber mesh have diameters from 100 nm to 10 μm.

6. The system of claim 1, wherein the sorbent material comprises a coating, and wherein the coating primarily captures the $CO_2$.

7. The system of claim 1, further comprising a drying zone configured to remove moisture from the sorbent material after the sorbent material is exposed to the humid air in the humid zone, and before being exposed or re-exposed to the inlet air stream.

8. The system of claim 1, wherein the $CO_2$ storage material comprises a hydroxide material.

9. The system of claim 1, wherein the $CO_2$ storage material is located inside the humid zone.

10. The system of claim 9, wherein the $CO_2$ storage material comprises a hydroxide material which is converted to a carbonate material upon reaction with the $CO_2$, and wherein water is released into the humid zone due to the reaction.

11. The system of claim 10, wherein the humid zone comprises a closed airflow loop.

12. The system of claim 11, further comprising a fan, wherein the fan is configured to promote exchange of the water from the $CO_2$ storage material to the sorbent material, and to transfer the $CO_2$ released from the sorbent material to the $CO_2$ storage material.

13. The system of claim 12, further comprising a humidity control system comprising one or more of a dehumidifier and a humidifier, wherein the humidity control system is located within the humid zone and is configured to control humidity of the humid zone.

14. The system of claim 1, further comprising one or more filters configured to capture volatile organic chemicals (VOCs) and particles from the inlet air stream.

15. The system of claim 1, further comprising a UV light source to disinfect viruses and bacteria from the inlet air stream.

16. A method comprising:
   rotating a first portion of sorbent material into an air process zone within a first angular range using a rotatable sorbent wheel, wherein an inlet air stream flows through the first portion of the sorbent material in the air process zone;
   capturing $CO_2$ from the inlet air stream using the first portion of the sorbent material in the air process zone;
   rotating the first portion of the sorbent material into a humid zone within a second angular range using the rotatable sorbent wheel, wherein the first portion of the sorbent material is exposed to a humid environment in the humid zone;
   releasing the $CO_2$ from the first portion of the sorbent material, while the first portion is in the humid zone; and storing the $CO_2$ using a storage material located proximate to the humid zone, wherein the storage material is configured to capture and store the $CO_2$ released from the first portion of the sorbent material.

17. The method of claim 16, further comprising rotating a second portion of the sorbent material using the rotatable sorbent wheel, wherein the second portion of the sorbent material is located approximately 180 degrees around a circumference of the rotatable sorbent wheel from the first portion of the sorbent material, wherein the second portion of the sorbent material is in the second angular range while the first portion of the sorbent material is in the first angular range, and wherein the second portion of the sorbent material is in the first angular range while the first portion of the sorbent material is in the second angular range.

18. The method of claim 16, further comprising rotating the first portion of the sorbent material into a drying zone within a third angular range using the rotatable sorbent wheel, wherein the third angular range is located between the first angular range and the second angular range, and wherein water is removed from the first portion of the sorbent material in the drying zone.

19. The method of claim 16, wherein the storing the $CO_2$ further comprises:
  reacting the released $CO_2$ with the storage material to convert the storage material into a $CO_2$-containing material; and
  releasing water into the humid zone from the storage material.

20. The method of claim 19, wherein the storage material is a hydroxide, which is converted to a carbonate material upon reaction with the released $CO_2$, and wherein the water is released into the humid zone due to the reaction.

\* \* \* \* \*